UNITED STATES PATENT OFFICE.

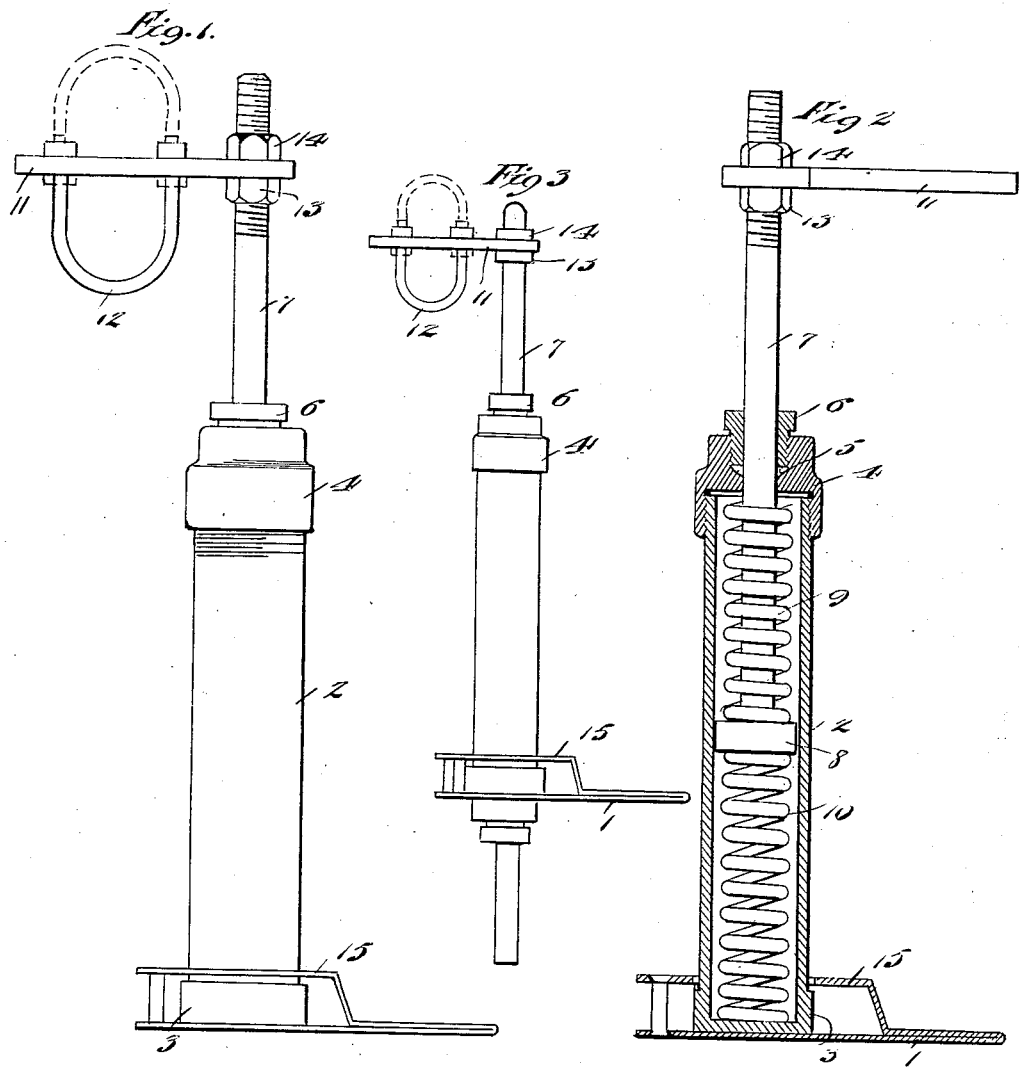

GEORGE A. STAFFORD, OF SOUR LAKE, TEXAS.

SHOCK-ABSORBER.

1,215,736. Specification of Letters Patent. Patented Feb. 13, 1917.

Application filed February 7, 1916. Serial No. 76,524.

*To all whom it may concern:*

Be it known that I, GEORGE A. STAFFORD, a citizen of the United States, residing at Sour Lake, in the county of Hardin and State of Texas, have invented certain new and useful Improvements in Shock-Absorbers, of which the following is a specification.

My invention relates to shock absorbers and particularly to devices for attaching to the front and rear axles of vehicles; and the object is to provide a simple and inexpensive device which can be attached to any motor car of ordinary construction and which can be readily attached and detached without other expense than the device itself and to provide a device which will not be deteriorated in use because means are provided for protecting and prolonging the life of the springs. One advantage is that the device checks the shock and absorbs the shock with the same smoothness in operation in both the downward and the upward motion. Another advantage is that oil is used to coöperate with the springs to relieve the severe strain on the springs and thereby preventing the crystallization of the springs. Other objects and advantages will be fully explained in the following description and the invention will be more particularly pointed out in the claims.

Reference is had to the accompanying drawings which form a part of this application.

Figure 1 is a side elevation of the shock absorber. Fig. 2 is a vertical section of the barrel, showing the springs within the barrel. Fig. 3 is a side elevation of a shock absorber which is a slight variation from the shock absorber shown in the previous views.

Similar characters of reference are used to indicate the same parts throughout the several views.

The shock absorber is provided with a support 1 which can be attached to any axle by placing the same under the spring of the vehicle or by attaching the same with U-bolts of the kind shown at the upper end of the shock absorber. A barrel 2 has a boss 3 for convenience in securing the barrel in place. The upper end of the barrel is closed by a cap 4 which is screwed on the barrel and in which is provided a stuffing box or packing gland 5 which is closed by the perforated plug 6 which will keep out all sand or dust. A plunger rod 7 operates in the barrel 2 and carries a plunger 8 which is somewhat smaller in diameter than the barrel, the object being to allow oil to pass between the plunger and the barrel during the operation of the plunger rod. Spiral springs 9 and 10 are mounted in the barrel 2, one above and one below the plunger 8. The spring 10 absorbs the shock on the downward movement and the spring 9 absorbs the shock on the upward movement of the plunger rod 7. In the movement of the plunger 8, the oil also serves to cushion the movement of the plunger. The plunger 8 is made large enough to prevent the passage of the oil in large quantities so that the oil is forced in a small quantity past the plunger, thus retarding the movement of the plunger. This will relieve the strain on the springs 9 and 10. The oil will preserve the springs by keeping away rust and also by preventing the crystallization of the springs, that is, conserving the resiliency of the springs. The plunger rod 7 is attached to the springs of the vehicle by means of a suitable bar 11 and a U-bolt 12 which may be above or below the bar 11. Lock-nuts 13 and 14 are provided so that the bar 11 can be placed at different adjustments on the plunger rod 7. The plunger rod 7 should be longer at the beginning of its use so that as the springs 9 and 10 become weak, the rod 7 can be lowered into the barrel and thus gain the necessary tension of the springs.

The variation shown in Fig. 3 has the advantage of the plunger rod running through the bottom of the barrel 2. In the form shown in Figs. 1 and 2, the barrel 2 cannot be filled entirely with oil because there must be space for the plunger rod 7 as it goes down in the barrel. With the form shown in Fig. 3, when the plunger 7 is going down in the barrel, an equal amount of the plunger is passing out of the barrel. Consequently the barrel can be filled entirely with oil, so that the springs 9 and 10 will be immersed in oil during the whole time. A stuffing box or gland is provided and closed with a perforated plug 6. The upper part 15 of the support 1 has the opening therethrough larger than the barrel 2 so that the upper part of the barrel can be vibrated to some extent to yield as the springs of the vehicle may be swayed by the movement of the vehicle body.

What I claim, is,—

1. A shock absorber comprising a barrel, a support for said barrel for attaching the barrel to a vehicle axle consisting of two parts, one part supporting the barrel and the other part engaging the barrel loosely to prevent displacement of the barrel, a plunger rod adapted to reciprocate in said barrel and projecting therefrom, means for closing the barrel about said rod, a plunger in said barrel carried by said rod, means for retarding the motion of the plunger, and means for connecting said rod with a movable part of the vehicle.

2. A shock absorber comprising a barrel having a shoulder on the lower part of the barrel, a support for the barrel in two parts for attaching the barrel to a vehicle axle, the lower supporting the barrel and the upper having an opening larger than the barrel and engaging the barrel loosely above said shoulder to prevent removal of the barrel, a rod adapted to reciprocate in said barrel and projecting therefrom, a plunger in said barrel carried by said rod, means for retarding the motion of said plunger, and means for attaching said rod to a movable part of the vehicle.

In testimony whereof, I set my hand this 2nd day of February, 1916.

GEORGE A. STAFFORD.